(12) United States Patent
Power (10) Patent No.: US 9,347,515 B2
(45) Date of Patent: May 24, 2016

(54) REDUCED NOISE DECOUPLER (75) Inventor: Douglas L. Power, Kitchener (CA)

(73) Assignee: COOPER-STANDARD AUTOMOTIVE INC., Novi, MI (US)

( * ) Notice: Subject to any disclaimer, the term of this patent is extended or adjusted under 35 U.S.C. 154(b) by 0 days.

(21) Appl. No.: 13/880,547

(22) PCT Filed: Oct. 24, 2011

(86) PCT No.: PCT/US2011/057471
§ 371 (c)(1),
(2), (4) Date: Jul. 23, 2013

(87) PCT Pub. No.: WO2012/054916
PCT Pub. Date: Apr. 26, 2012

(65) Prior Publication Data
US 2013/0292889 A1 Nov. 7, 2013

Related U.S. Application Data (60) Provisional application No. 61/405,991, filed on Oct. 22, 2010.

(51) Int. Cl.
*F16M 5/00* (2006.01)
*F16F 13/10* (2006.01)
*F16F 9/348* (2006.01)

(52) U.S. Cl.
CPC .................. *F16F 13/10* (2013.01); *F16F 9/348* (2013.01); *F16F 13/106* (2013.01)

(58) Field of Classification Search
USPC ......... 267/140.11–140.13; 248/550, 562, 565
See application file for complete search history.

(56) References Cited

U.S. PATENT DOCUMENTS

| | | | | |
|---|---|---|---|---|
| 4,611,795 A | * | 9/1986 | Muzechuk | 267/140.13 |
| 4,742,999 A | * | 5/1988 | Flower | 267/140.13 |
| 5,167,403 A | * | 12/1992 | Muramatsu et al. | 267/140.13 |
| 7,258,331 B2 | | 8/2007 | Schneider | |
| 7,419,144 B2 | | 9/2008 | Hasegawa et al. | |
| 2002/0043748 A1 | * | 4/2002 | Meyer | 267/140.11 |
| 2009/0302515 A1 | * | 12/2009 | Graeve et al. | 267/140.13 |
| 2011/0024960 A1 | | 2/2011 | Bradshaw et al. | |
| 2011/0221106 A1 | * | 9/2011 | Reinke et al. | 267/140.13 |

FOREIGN PATENT DOCUMENTS

JP 2010 084789 4/2010

OTHER PUBLICATIONS

PCT/US2011/057471 International Search and Written Opinion (mailed Mar. 20, 2012).
JP 2013-535138, Office Action mailed May 27, 2015.

* cited by examiner

*Primary Examiner* — Christopher Schwartz
(74) *Attorney, Agent, or Firm* — Fay Sharpe LLP (57) ABSTRACT

A reduced noise decoupler has a perimeter with a wavy form. This provides a significant reduction in the initial contact noise. Hydraulic pressure deforms the wavy edges, pressing the wavy edge flat and creating the necessary seal. The edge geometry is created such that pressure will flatten the decoupler perimeter without creasing, ensuring a proper seal without losses. This is achieved by drawing the wavy detail from the perimeter to an interior of the decoupler body in alternating fashion to create a pattern of peaks and troughs bounded by thicker sections, allowing the edges to easily deform without creasing.

16 Claims, 7 Drawing Sheets

Figure 9 ly damped elastomeric powertrain mounts deployed to control shake and vibration responses resulting from various sources such as road inputs. The hydraulically damped powertrain mount commonly comes in the form of a rubber isolator containing a hydraulic fluid cavity which acts as a pump when excited by vibration. The pumped fluid oscillates through a tube called an inertia track which creates a fluid resonance system and associated damping to dissipate the vibration energy and reduce the shake response. These types of mounts are generally shown and described in commonly owned published international patent application WO105768 A1, the entire disclosure of which is hereby expressly incorporated herein by reference.

It is often desired to have a "bypass valve" designed into the fluid system to allow the pumped fluid to bypass the inertia track and flow directly into a low pressure reservoir under certain conditions, typically low amplitude vibrations, such as engine idle speed inputs, where isolation rather than damping is preferred to eliminate vibration. This bypass valve usually takes the form of a simple rubber disc or other flat shape, fitted between two perforated rigid forms, such as pierced metal plates, which is positioned to provide a short, direct route to the low pressure reservoir.

Clearance between the thickness of the disc and the spacing of the perforated plates permits unimpeded flow between the pump chamber and low pressure reservoir for small vibration inputs, while effectively sealing the pathway and forcing the fluid to flow through the inertia track during high amplitude vibration. The disc or other shape that redirects fluid flow depending on the amplitude of the vibration input is referred to as a decoupler, and forms a key component in most hydraulically damped powertrain mounts made today.

A common problem with this type of arrangement is noise that is generated by the decoupler, commonly referred to as decoupler "chortle". Under high amplitude inputs, the decoupler component is forced back and forth between the upper and lower plates under significant hydraulic pressure and generates noise as it contacts each plate. The volume and character of this internally generated noise is dependent on several design factors such as the area of the decoupler surface that contact the upper and lower plates, pumping capacity of the mount assembly as a function of vibration input, and spacing between the plates. Usually decoupler rattle/chortle is a problem at mount transients (large displacements) such as engine start-up/shutdown. Further, mounts with relatively large decoupler travels (i.e. small surface area) are prone to exhibit the problem.

Historically, this self-generated noise is undetectable within the passenger compartment. However, with the improvements in sound quality in automobiles over the years, decoupler chortle continues to be a noise and vibration handling (NVH) issue that automotive engineers often struggle with.

SUMMARY OF THE DISCLOSURE

The present disclosure is a decoupler design that significantly reduces chortle noise from within a hydraulic mount assembly.

A decoupler used in a hydraulically damped mount includes a body having a perimeter surface with a non-planar conformation and an interior region extending inwardly from the perimeter surface that also has a non-planar conformation.

In one embodiment, the decoupler has an elongated, generally oval shaped body.

The body preferably has a varying thickness.

The non-planar conformation is a generally wavy profile from the perimeter to an interior of the decoupler body that creates a pattern of peaks and troughs.

The pattern of peaks and troughs is bounded by thicker sections.

The pattern of peaks and troughs is irregular.

The decoupler is formed of a rubber or an elastomeric material.

The decoupler body has a varying thickness throughout a cross-section thereof.

The decoupler body has first and second opposite surfaces having a dimension substantially greater than a thickness defined therebetween, and each of the first and second surfaces has a non-planar profile.

The nonplanar profile of the first and second surfaces is a generally wavy profile.

A damper assembly includes a housing having a dividing wall that separates first and second chambers in selective fluid communication with each other via a bypass opening and an elongated path. A decoupler is operatively associated with the elongated path and selectively positioned to open or close the bypass opening. The decoupler has a non-planar, wavy contour.

One benefit is that the present design provides superior chortle noise reduction without altering the damping profile and peak damping magnitude.

Contoured surfaces of the decoupler minimize contact areas with upper and lower plates, regardless of the perforation pattern of the decoupler cage deployed.

The new decoupler designs can be made from the same materials as conventional decouplers.

Still another advantage is that the design does not require surface irregularities such as pits or bumps to provide noise reduction, where use of pits or bumps in previous designs are prone to rubber cavity mould fouling which can result in inconsistent manufacture of the decoupler.

The new arrangement also provides for a fully decoupled design.

Still other features and benefits will be found in the following detailed description.

DETAILED DESCRIPTION OF THE PREFERRED EMBODIMENTS

FIGS. 1-5 show a known hydraulically damped powertrain mount, and FIGS. 6-9 more particularly show a decoupler design for use in the mount of FIGS. 1-5 or still other designs of hydraulically damped powertrain mounts. The decoupler design of the present disclosure will operate quietly under high amplitude vibrations while providing no loss of damping capability and maintaining a completely decoupled mode of operation for low amplitude inputs.

This description presumes that those reading are familiar with the basic construction and operating principles of hydraulically damped powertrain mounts, commonly referred to as hydromounts and as illustrated in FIGS. 1-5 (drawings taken from commonly owned international published application WO 2009/105768 A1). However, for purposes of background, the mount of FIGS. 1-5 will be briefly described although one skilled in the art will understand that this is but one design of hydraulically damped powertrain mount that may incorporate the features of the present disclosure and the present application should not be limited to any one particular style of hydraulically damped mount.

Figure 1:
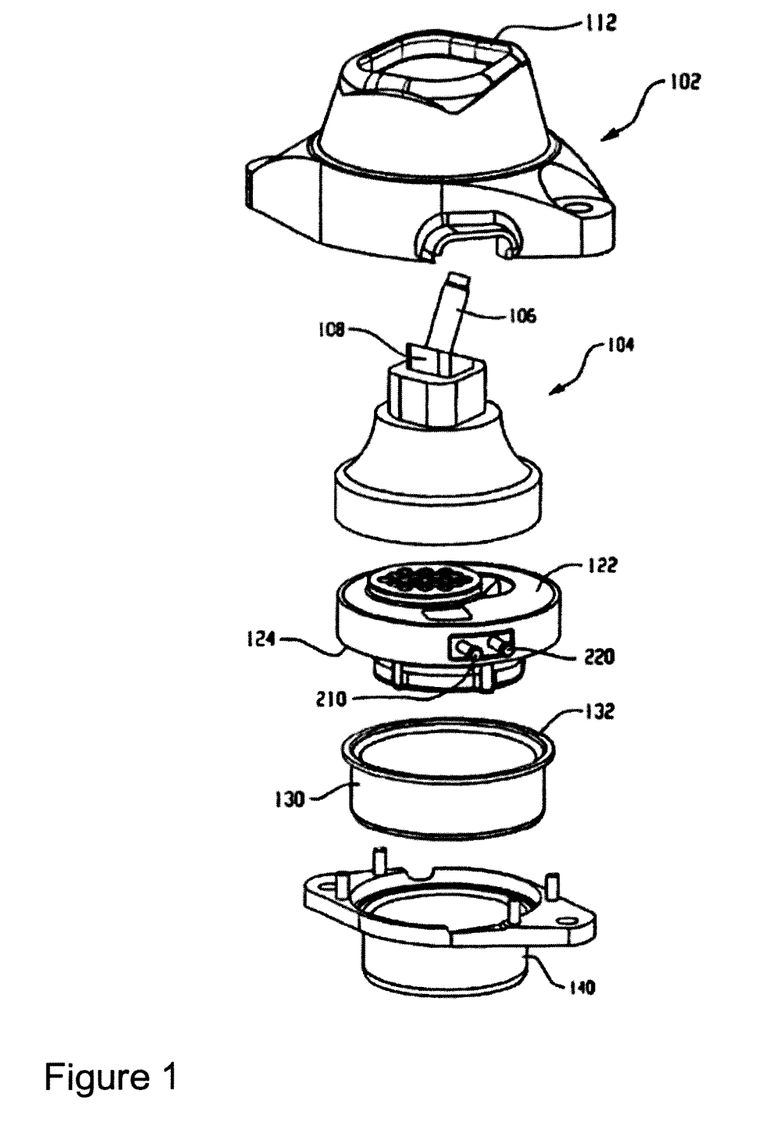
FIG. 1 is an exploded view of one type of hydraulically damped powertrain mount.
Figure 2:
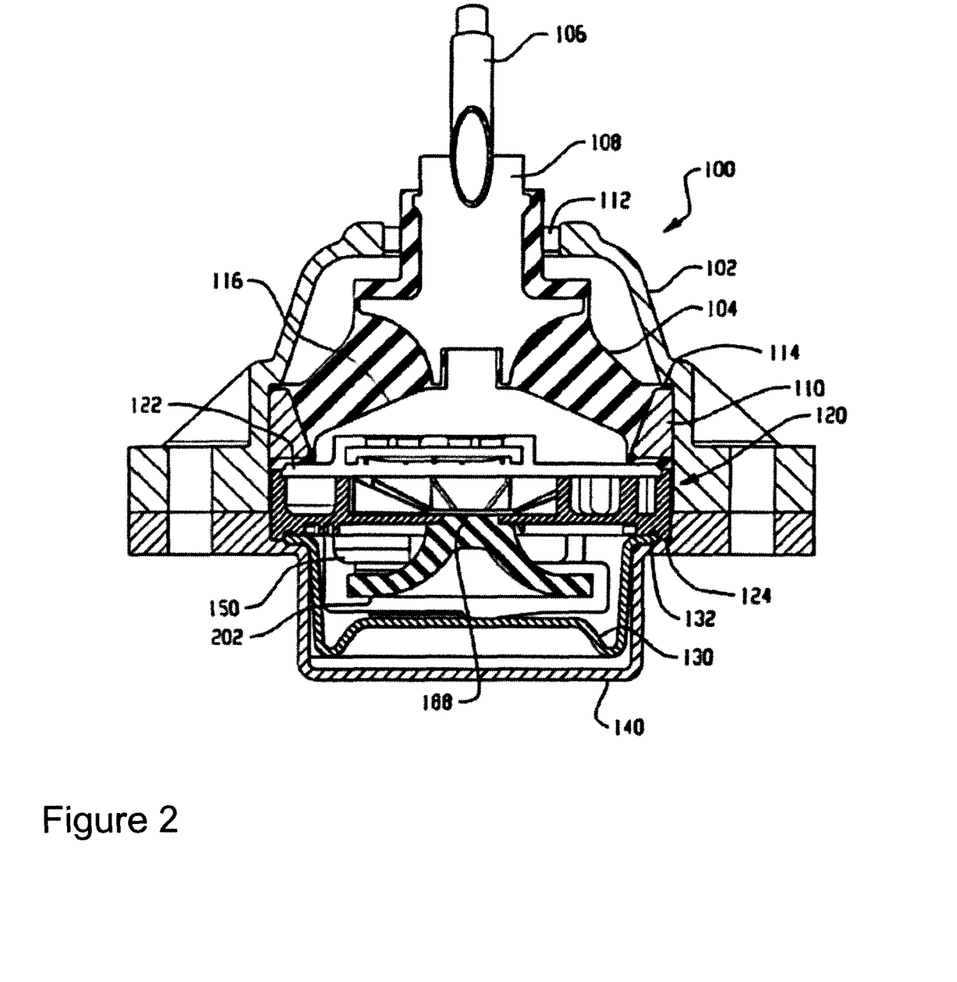
FIG. 2 is a cross-sectional view of the mount of FIG. 1.
Figure 3:
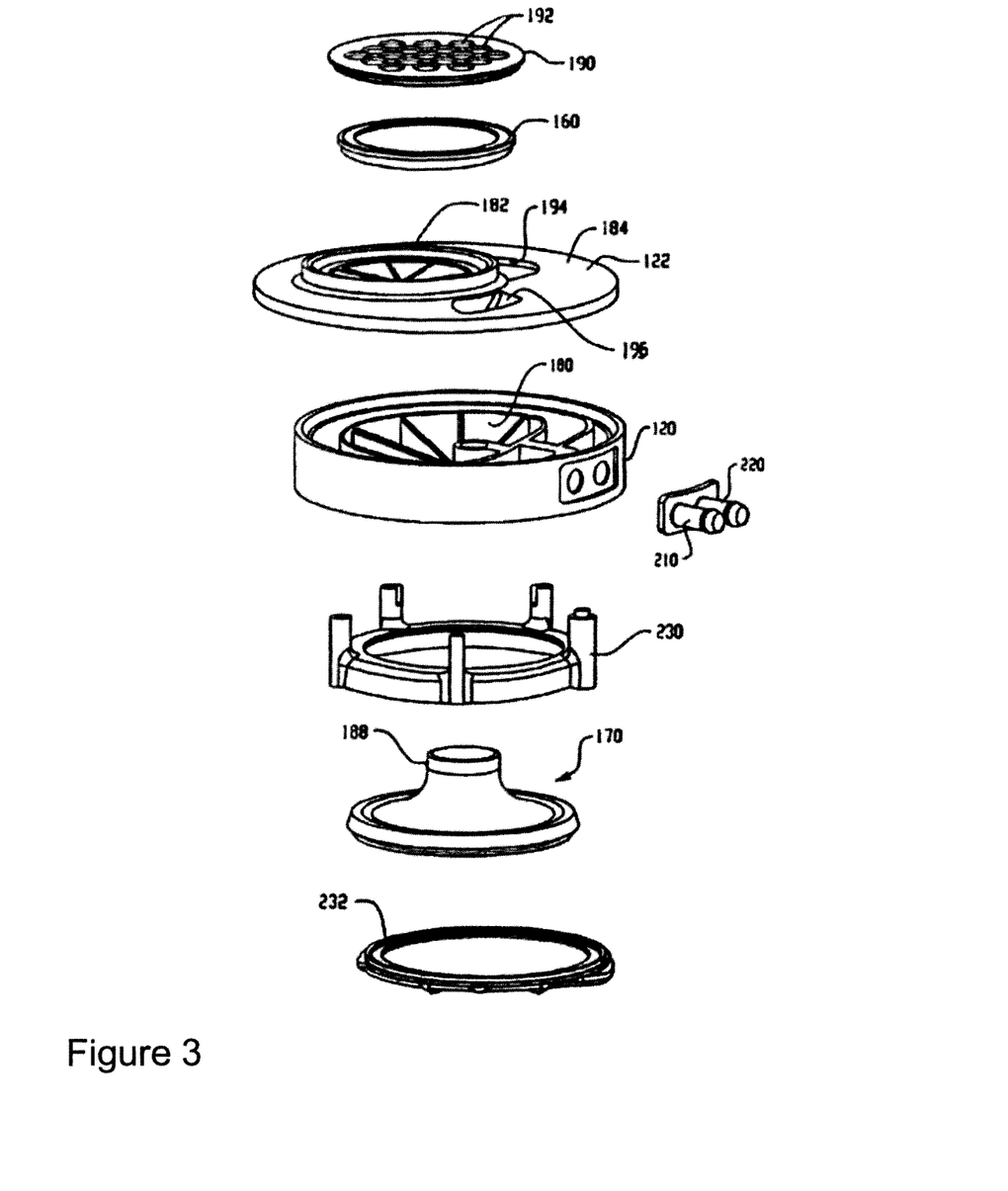
FIG. 3 is an enlarged, exploded view of a portion of the mount of FIGS. 1 and 2.
Figure 4:
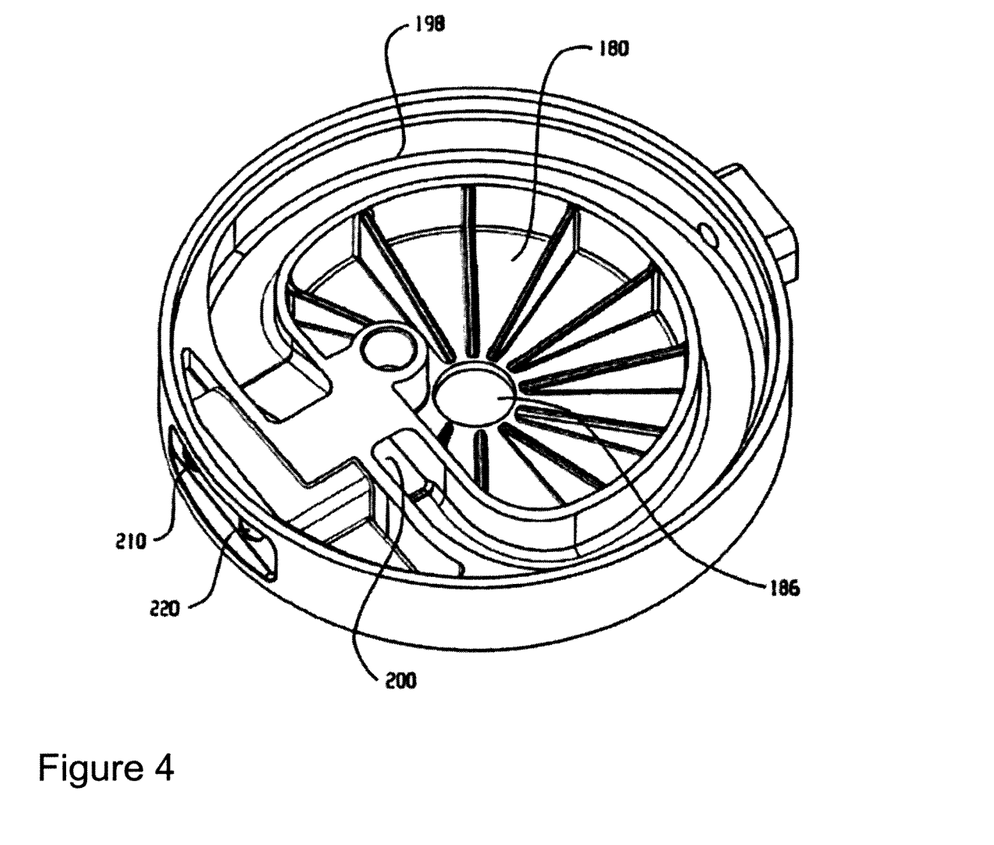
FIG. 4 is a perspective view of a portion of the inertia track.
Figure 5:
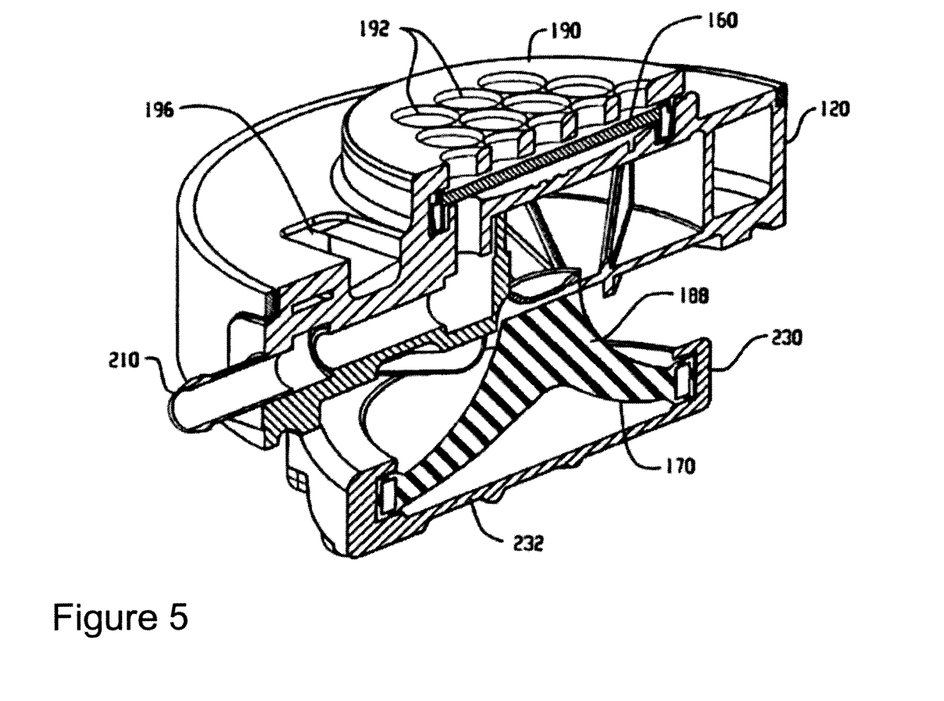
FIG. 5 is an enlarged perspective cross-sectional perspective view of the mount portion of FIG. 3.
Figure 6:
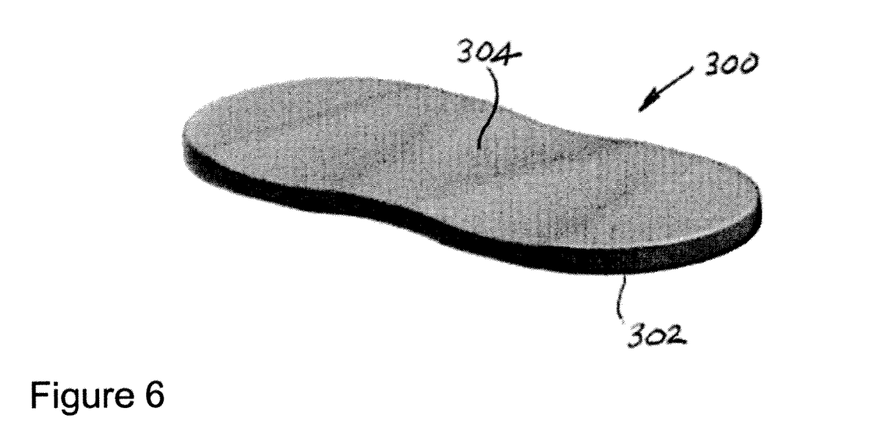
FIG. 6 is a plan view of a first preferred embodiment of the decoupler of the present disclosure.
Figure 7:
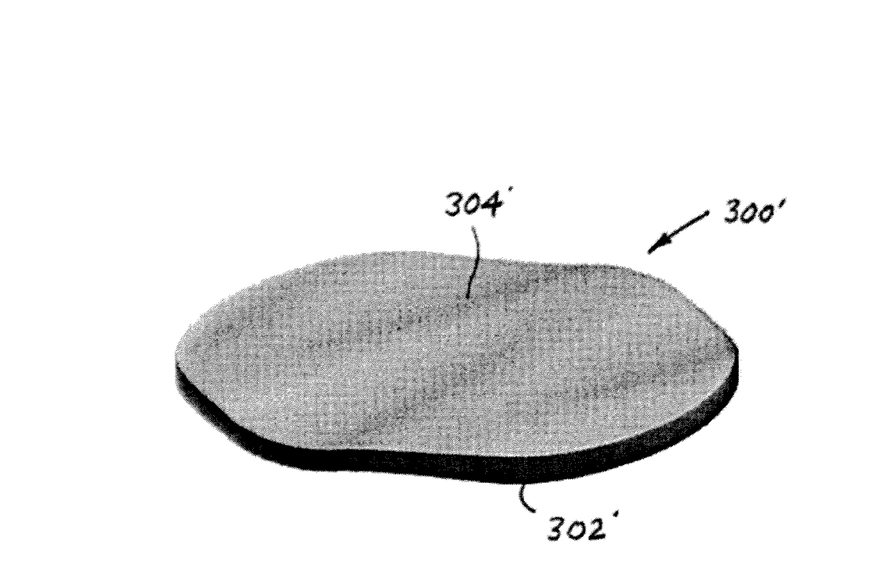
FIG. 7 is a plan view of a second preferred embodiment of the decoupler of the present disclosure.
Figure 8:
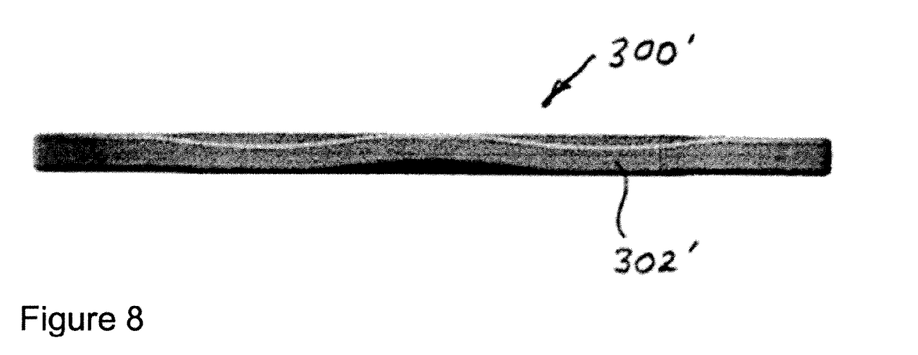
FIGS. 8 and 9 are elevational views of the decoupler of FIG. 7.
Figure 9:
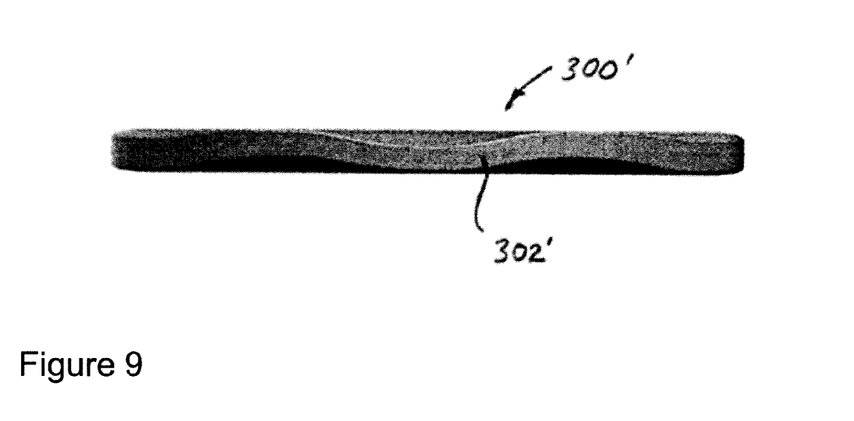

A hydromount assembly 100 includes a restrictor or external housing 102 dimensioned to receive a first or elastomeric component or main rubber element 104 that is generally shaped as a truncated cone, and primarily made of an elastomeric material, such as an elastic rubber as is conventional in the art. A fastener or bolt 106 extends outwardly from the main rubber element for fastening to the powertrain or engine (not shown) in a manner generally known in the art. The fastener cooperates with a metal bearing member 108 that has at least a portion encapsulated within the first elastomeric member 104. In addition, a lower peripheral portion of the main rubber element may include a stiffener, such as metallic stiffener 110, molded within the main rubber element to add rigidity and support.

The main rubber element is received within the restrictor housing 102 so that the fastener 106 extends through a central opening 112 in the restrictor. An internal shoulder 114 (FIG. 3) of the restrictor abuttingly engages the reinforced, lower portion of the main rubber element. In addition, the lower portion of the main rubber element forms a portion of a first or upper fluid chamber 116, namely the high pressure side, of the engine mount. The remainder of the first fluid chamber 116 is defined by the inertia track assembly 120, more specific details of which will be described below. An outer radial portion of an upper surface of the inertia track assembly denoted by reference numeral 122 abuttingly and sealingly engages the main rubber element 104 in order to seal the first fluid chamber 116. At least a portion of the inertia track assembly is received within the restrictor housing 102. A second outer radial portion along the lower surface denoted by reference numeral 124 is sealingly engaged by a rubber boot or diaphragm 130, and particularly an upper peripheral portion 132 thereof. The diaphragm 130 is protected by a diaphragm cover 140, preferably formed of a more rigid material than the elastomeric diaphragm, and that matingly engages the restrictor housing 102. When the diaphragm cover 140 is fastened to the restrictor, the lower peripheral edge of the main rubber element 104 and the peripheral portion 132 of the diaphragm sealingly engage opposite sides or faces 122, 124, respectively, of the inertia track assembly 120.

As vibrations or displacements are received into the mount from the powertrain, fluid is pumped from the first fluid chamber 116 through the inertia track assembly 120 in different ways. The inertia track assembly 120 is disposed between the first or upper fluid chamber 116 and the second or lower fluid chamber 150. Thus, the upper side of the inertia track assembly is associated with the high pressure side of the mount. On the other hand, the lower surface of the inertia track assembly is associated with the second or lower fluid chamber 150 and is sometimes referred to as the low pressure side of the mount. The fluid is pumped from the top to the bottom through the inertia track assembly. The path that the fluid takes through the inertia track assembly depends on a decoupler 160 and an idle diaphragm 170. More particularly, the decoupler 160 of previously known arrangements is preferably a rubber or elastomeric disk or similar structural arrangement received over a portion of a first opening or path 180 through the high frequency inertia track. Thus, the rubber decoupler 160 is dimensioned for close receipt within a cup shaped recess 182 in an upper surface 184 of the housing, which has an opening or path to the high frequency inertia track 180 and particularly a central opening 186 (FIG. 4) that is selectively closed by a central portion 188 of the idle diaphragm 170. Thus, a decoupler cover 190 has a series of openings 192 that allow fluid from the first fluid chamber to pass therethrough, and around the decoupler 160 and into the high frequency inertia track 180, particularly through opening 182, in addition to passing through opening 194. This is the path of least resistance from the first/upper fluid chamber 116, to the second/lower fluid chamber 150 disposed above the idle diaphragm 170, i.e., the fluid side of the idle diaphragm.

Alternatively, a second path, or elongated low frequency inertia track has an opening 196 radially outward of the decoupler cover in the decoupler housing that communicates with an elongated or a serpentine low frequency inertia track 198 that ultimately communicates with opening 200 through a lower surface of the inertia track housing in communication with the second/lower fluid chamber 150. Fluid only flows through this serpentine path 198, however, when the high frequency inertia track path is otherwise blocked. So, for example, where the idle diaphragm is shown in its extended position as shown in FIG. 2, the high frequency inertia track is closed since opening 186 is sealed by the central portion 188 of the idle diaphragm 170. Fluid must then proceed through the low frequency inertia track 198 to exit through opening 200 that communicates with the low pressure side of the mount. As will be appreciated, this occurs when no vacuum is applied to the underside of the idle diaphragm. In addition, the decoupler 160 is allowed to freely oscillate creating a decoupled state for low input displacements. For higher input displacements, the fluid is forced through the low frequency inertia track.

Decoupler chortle, or noise generated by the oscillating contact between the decoupler component and the upper and lower perforated grids that form the decoupler cage, is present in some degree in every design of decoupled hydromount. Non-decoupled hydromount designs are not considered as they do not incorporate a decoupler fluid bypass system and are free from decoupler induced noise.

The amount of audible decoupler noise that emanates from an operating hydromount is dependent on many factors including relative pumping forces, decoupler area and spacing between the capture grids, decoupler velocity in operation, etc. With all other things being equal, the generated noise becomes a function of the decoupler design itself. The most relevant factors become the amount of surface area contact between decoupler component and the relative hardness of the decoupler itself.

Beginning with the most simplistic decoupler design, that of a basic flat rubber washer, the relative contact area as the decoupler is forced against one of the grid surfaces, is maximum, with all points making contact simultaneously. Flat decouplers thus tend to generate the maximum noise level in a specific hydromount assembly. This can be reduced by using a softer rubber compound, but relative flex of this softer material when under maximum hydraulic pressure reduces the performance along with the noise level.

Many techniques have been tried over the years to reduce operating noise levels while maintaining performance. One option, often called a "captured" decoupler design, has the decoupler built with a thick outer perimeter rib that is pre-compressed between the capture grids when assembled, and a thinner center flat section that oscillated between the grid plates during operation. The cross-section typically resembles an I-beam or variant thereof. The design is capable of reducing noise levels over the basic flat decoupler, but the noise is generally still detectable and the captured design concept does not allow for true "decoupled" operation, as the captured perimeter essentially seals off the fluid bypass.

Various irregular surface patterns have also been tried, such as patterns of small bumps, but the results have often been less than desirable. A common theme with these free floating decoupler designs has been a continuous flat perimeter edge which creates the required seal against the grid plates, while the various surface irregularities are positioned inboard from the sealing edge to interface with the grid pattern. The major flaw with this design approach is that the perimeter of the decoupler generally constitutes the largest area of continuous contact between the cage grid and decoupler. So no matter what geometry is applied to the decoupler surface in the interior regions, the flat perimeter continues to generate objectionable contact noise during its function.

The present decoupler 300 shown in FIGS. 6-9 overcomes these issues in several ways. A first design feature is that a perimeter 302 is no longer a continuous flat surface, but is desirably not flat and preferably constructed with a wavy form. This feature enables the decoupler to contact the perimeter of the grid in multiple small patches of much smaller total area than a full flat perimeter profile. This provides a significant reduction in the initial contact noise. Hydraulic pressure then deforms the wavy edges, pressing them flat against the grid and creating the necessary seal. The edge geometry is created such that pressure will flatten the decoupler perimeter 302 without creasing, ensuring a proper seal without losses. This is achieved by drawing the "wavy" detail from the perimeter to an interior 304 of the decoupler body in alternating fashion to create a pattern of peaks and troughs bounded by thicker sections, allowing the edges to easily deform without creasing. This provides the necessary seal without meaningful energy loss. The varying thickness throughout the decoupler body 300 also serves to protect against permanent set which could potentially "flatten out" a decoupler that was moulded with a wavy profile but equal thickness throughout.

Two examples (decoupler 300 in FIGS. 6 and 300' FIG. 7-9) of preferred forms of the decoupler geometry are shown in the drawings. As is evident in the Figures, the surface contour or wave-like contour is not a series of parallel waves (e.g., non-uniform), but rather the peaks and valleys are preferably smoothly contoured and diverge/converge as the waves proceed across the wide dimension of the decoupler (i.e., the surfaces exposed to the pressure). One skilled in the art will appreciate that in any application, design details may require development to custom tailor specific features to the application. The present disclosure distinguishes itself from prior art in several ways. The decoupler design provides superior chortle noise reduction without altering the damping profile and peak damping magnitude, as compared to regular flat decouplers, and especially slitted decouplers that allow some blow-by of fluid under maximum pressure to reduce noise but at the sacrifice of performance. Contoured surfaces minimize contact areas with upper and lower plates, regardless of the perforation pattern deployed. The decoupler 300 can be made from the same materials as conventional decouplers i.e., an elastomeric or rubber material is commonly used. The decoupler 300 does not require surface irregularities such as pits or bumps to provide noise reduction, which improves manufacturing and reduces mould fouling. The decoupler provides a fully decoupled design as opposed to a "captured" decoupler design which uses a fixed perimeter and moving central section to reduce noise, but tends to generate damping at non-desired low frequency vibrations.

The specially designed surface contours which lead in to a wavy perimeter profile minimizes the initial surface contact with the upper and lower perforated plates, and the wave-like form of the decoupler significantly reduces initial contact noise. After initial contact is achieved, hydraulic pressure from the pumped fluid is used to flatten the wavy edges and create the seal required to force fluid thru the inertia track. The edge geometry ensures that hydraulic pressure will seal the decoupler perimeter without creasing and without fluid losses. The variable thickness through the decoupler cross-section ensures that the decoupler 300 does not "flatten" over time (protects against permanent set) and diminish its noise reduction properties.

This disclosure distinguishes itself from the prior art in several ways. The decoupler provides superior chortle noise reduction without altering the damping profile and peak damping magnitude, as compared to regular flat decouplers, and especially slitted decouplers that allow some blow-by of fluid under maximum pressure to reduce noise but at the sacrifice of performance. The contoured surfaces minimize contact areas with upper and lower plates, regardless of the perforation pattern deployed. The present design can be made from the same materials as conventional decouplers. The new decoupler does not require surface irregularities such as pits or bumps to provide noise reduction, which improves manufacturing and reduces mold fouling. The new decoupler provides a fully decoupled design as opposed to a "captured" decoupler design which uses a fixed perimeter and moving central section to reduce noise, but tends to generate damping at non-desired low frequency vibrations.

The specially designed surface contours which lead in to a wavy perimeter profile minimizes the initial surface contact with the upper and lower perforated plates. After initial contact is achieved, hydraulic pressure from the pumped fluid is used to flatten the wavy edges and create the seal required to force fluid through the inertia track. The variable thickness through the decoupler cross-section ensures that the decoupler does not "flatten" over time and diminish the noise reduction properties of the decoupler.

The disclosure has been described with reference to preferred embodiments. Modifications and alterations will occur to others upon reading and understanding this specification. This disclosure is intended to include all such modifications and alterations in so far as they come within the scope of the appended claims or the equivalents thereof.

I claim:

1. A decoupler used in a hydraulically damped mount comprising:
    a body having a perimeter surface with a non-planar conformation and an interior region extending inwardly from the perimeter surface that also has a non-planar conformation, the non-planar conformation is a generally wavy, irregular pattern of alternating irregular peaks and troughs that extend from the perimeter to an interior and across an entirety of the decoupler body.

2. The damper assembly of claim wherein the non-planar conformation of the interior region of the body includes non-parallel waves.

3. The damper assembly of claim 2 wherein the non-parallel waves across the interior region of the body are smoothly contoured.

4. The damper assembly of claim 2 wherein the non-parallel waves across the interior region of the body diverge and converge relative to one another.

5. The decoupler of claim 1 wherein the body has first and second opposite surfaces having a dimension substantially greater than a thickness defined therebetween, and each of the first and second surfaces has a non-planar profile.

6. The decoupler of claim 5 wherein the nonplanar profile of the first and second surfaces is a generally wavy profile.

7. The decoupler of claim 1 wherein the body has an elongated, generally oval shape.

8. The decoupler of claim 1 wherein the body has a varying thickness.

9. The decoupler of claim 1 wherein the pattern of peaks and troughs is bounded by thicker sections.

10. The decoupler of claim wherein the body is formed of a rubber or an elastomeric material.

11. The decoupler of claim 1 wherein the body has a varying thickness.

12. The damper assembly of claim 1 wherein the non-planar conformation of the interior region of the body includes non-uniform, non-parallel waves.

13. A damper assembly comprising:
a housing having a dividing wall that separates first and second chambers in selective fluid communication with each other via a bypass opening and an elongated path; and
a decoupler operatively associated with the elongated path and selectively positioned to open or close the bypass opening, the decoupler having a non-planar, wavy perimeter contour and an interior region extending inwardly from the perimeter surface that also has a non-planar conformation, the non-planar conformation is a generally wavy irregular profile from the perimeter to an interior of the decoupler body in alternating fashion to create an irregular pattern of peaks and troughs.

14. The damper assembly of claim 13 wherein the decoupler has an irregular perimeter.

15. The damper assembly of claim 13 wherein the decoupler has a varying thickness.

16. A decoupler used in a hydraulically damped, free-floating decoupler mount comprising:
a body having a varying thickness throughout a cross-section thereof and a perimeter surface with a non-planar conformation having a generally wavy profile creating an irregular pattern of peaks and valleys and an interior region extending inwardly from the perimeter surface that includes non-uniform, non-parallel waves.

* * * * *